United States Patent [19]
Arends

[11] Patent Number: 5,357,625
[45] Date of Patent: Oct. 18, 1994

[54] SYSTEM FOR IDENTIFYING COMMON FORMATS AND PROTOCOLS AND ALLOCATING RESPECTIVE BUFFERS SPACES FOR SIMULTANEOUS COMMUNICATION

[75] Inventor: Gregory J. Arends, Rochester, Minn.

[73] Assignee: International Business Machines Corporation, Armonk, N.Y.

[21] Appl. No.: 966,958

[22] Filed: Oct. 26, 1992

[51] Int. Cl.$^5$ .................. G06F 15/16; G06F 12/06
[52] U.S. Cl. ........................ 395/500; 395/250;
364/228.1; 364/239; 364/239.3; 364/939;
364/939.2; 364/939.81; 364/DIG. 2
[58] Field of Search ............... 395/275, 250, 500;
370/94.1, 79

[56] References Cited
U.S. PATENT DOCUMENTS

| | | | |
|---|---|---|---|
| 4,975,830 | 12/1990 | Gerpheide et al. | 395/500 |
| 5,142,528 | 8/1992 | Kobayashi et al. | 370/79 |
| 5,224,098 | 6/1993 | Bird et al. | 370/94.1 |

Primary Examiner—Thomas C. Lee
Assistant Examiner—Sang Hui Kim
Attorney, Agent, or Firm—Stephen T. Keohane

[57] ABSTRACT

A generic process for combining the support of multiple formats and protocols (FAPs) for simultaneous communication between a controller and an attached device over the same port is described. The transmission medium between the two units is a two-wire type cable, i.e., twisted pair, coaxial, etc., generically referred to as "Coax". The controller and the attached device each support their own collection of Coax FAPs, which may or may not be different. In accordance with the process, information is exchanged between the controller and the device identifying the particular Coax FAPs each respective unit supports and a set of Coax FAPs common to the controller and the device is identified. A communication buffer common to the controller and the device is configured for supporting the set of common Coax FAPs. Each Coax FAP may be independently enabled or disabled.

8 Claims, 2 Drawing Sheets

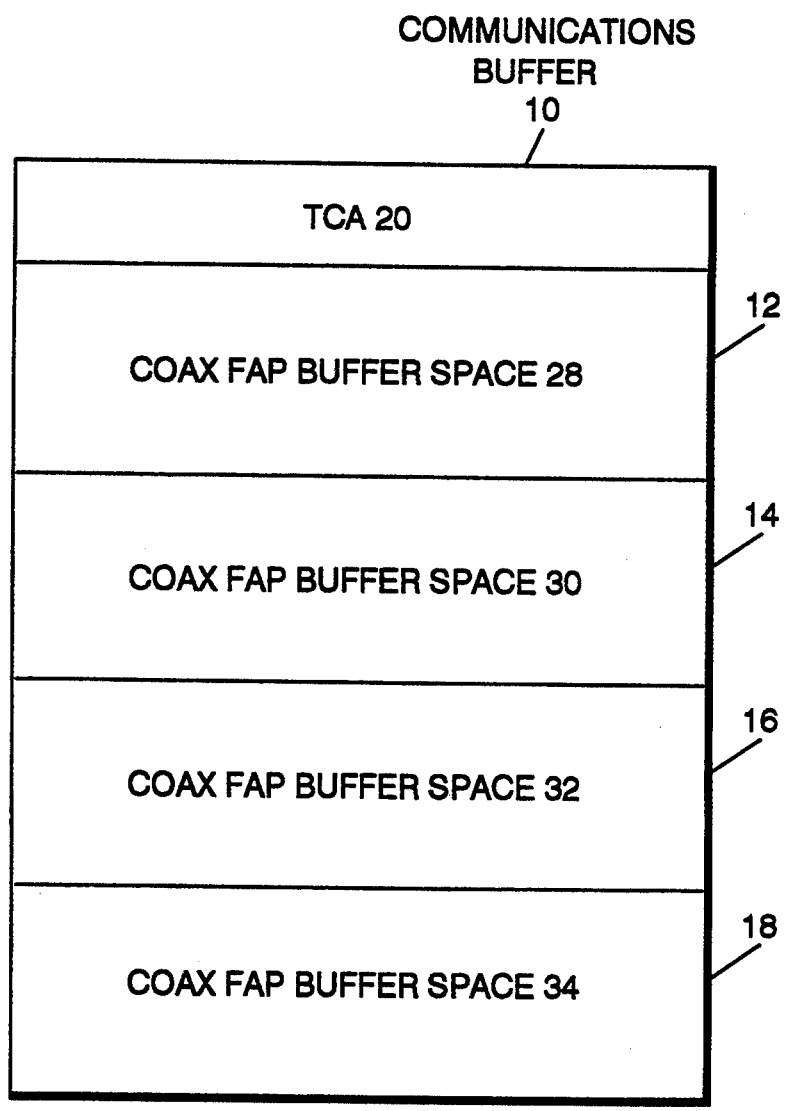

FIG. 2

| STATE (CUSTATE DSTATE) | ACTION | RESULTANT STATE |
|---|---|---|
| UNDEFINED (UND UND) | DEV: WRITE COAX FAPs SUPPORTED<br>WRITE ADDITIONAL POWER ON INFO<br>POR SCAN CODE TO CU | A |
| A: INACTIVE (0  0) | CU: WRITE POWER ON INFO<br>SET COAX FAP BITS IN CUSTATE<br>ISSUE RDEF AND START OP | B |
|  | DEV: RESPOND WITH BIT 6 STATUS<br>AFTER REDEFINITION IS COMPLETE |  |
| B: POWER ON PENDING (1  0) | CU: COMPLETE POWER ON PROCESSING<br>RESET COAX FAP BIT IN CUSTATE<br>ISSUE START OP TO DEVICE | C |
| C: DISABLED (0  0) | DEV: WRITE COAX FAP SPECIFIC INFO, IF ANY<br>SET COAX FAP BIT IN DSTATE<br>RETURN BIT 6 STATUS TO A POLL | D |
| D: ENABLE PENDING (0  1) | CU: WRITE COAX FAP SPECIFIC INFO, IF ANY<br>(OPT) WRITE COAX FAP ERROR, IF ANY<br>SET COAX FAP BIT IN CUSTATE<br>ISSUE START OP TO DEVICE | E |
| E: ENABLED (1  1)<br><br>CU & DEVICE CAN EXCHANGE FRAMES IN THIS STATE | CU: (OPT) WRITE COAX FAP ERRORS, IF ANY<br>OR FORCE ERROR TO REQUEST DISABLE<br>ISSUE START OP TO DEVICE |  |
|  | DEV: (OPT) WRITE COAX FAP ERRORS, IF ANY<br>RESET COAX FAP BIT IN DSTATE<br>RETURN BIT 6 STATUS TO A POLL | F |
| F: DISABLE PENDING (1  0) | CU: RESET COAX FAP BIT IN CUSTATE<br>ISSUE START OP TO DEVICE. | C |

SYSTEM FOR IDENTIFYING COMMON FORMATS AND PROTOCOLS AND ALLOCATING RESPECTIVE BUFFERS SPACES FOR SIMULTANEOUS COMMUNICATION

BACKGROUND OF THE INVENTION

I. Field of the Invention

The present invention relates to communication systems and more particularly to a method of configuring a system so that multiple formats and protocols are supported.

II. Prior Art

In a computer network, a terminal, such as the widely used IBM 3270 display control unit, is used as an interface between a user and a host computing system. Terminals may be asynchronous, where characters are transmitted one at a time between the host computer and the terminal, or synchronous, where characters are stored up in a buffer until the entire group is assembled. Although asynchronous terminals are the most common and the least expensive, synchronous terminals, such as the IBM 3270, are more efficient.

Although the communications lines from the terminals can be attached directly to the host computer, it is more common to use a cluster controller or a communications controller between the host computer system and the terminals. A cluster controller often consists of a small computer whose sole job is to control the operation of a group, or cluster, of terminals. A communications controller, among many other things, performs many communication-related functions, thus freeing up the host computer for application-related work. An example of a cluster controller is the IBM 3174 establishment controller.

The communications lines attaching the controller and the various terminals can be, at least theoretically, comprised of most any type of communications medium. The most common, however, is two-conductor cabling, such as coaxial, twisted pair and twisted shielded pair cabling. The term "Coax" will be used for the remainder of this specification to represent any of these cabling types (or equivalent).

Data is transmitted over the Coax medium between the host computer, the controller and the terminals in accordance with standard formats and protocols (FAPs). The two communicating units, i.e., a controller and a terminal, must support the same FAP in order to properly communicate.

There are a number of existing FAPs used for communicating across the Coax medium. The various FAPS normally correspond to the different types of terminals which can connect to the host computer. Examples of two 3270-type terminals having specific Coax FAPs are control unit terminals (CUTs) and distributed function terminals (DFTs).

The different types of terminals perform different functions depending upon the user's needs. For instance, CUTs do not interpret the 3270 data stream themselves, nor can they execute functions independently of the controller. The controller interprets the data stream and executes functions for the CUT. But, if a user wishes to obtain local reliability, availability and serviceability (RAS), network management and configuration information directly from the controller to which the user is attached, a CUT is required.

DFTs, on the other hand, cannot obtain the local RAS, network management and configuration information directly from the controller as can a CUT. But, the DFT can interpret the data stream and execute functions independently of the controller.

Distributed function terminal extended (DFT-E) is an extension of the DFT and enables a device and a controller to support a DFT interface and a limited CUT interface on the same device/controller port simultaneously. Thus, a user having the DFT-E function can have CUT and DFT sessions simultaneously.

Another FAP for operating with the 3174 establishment controller, not specifically related to a particular 3270-type terminal, is 3174 Peer Communication. 3174 Peer Communication allows existing intelligent devices to form a star-wired LAN segment that is bridged to an IBM Token-Ring through the 3174 Establishment Controller. 3174 Peer Communication provides a way for intelligent devices to communicate peer-to-peer, increase connectivity options, retain host connectivity, and share resources, such as files, data bases, application programs, and printers.

Each of the described FAPs provides a user with unique functions unsupported by other FAPs. It is desirable for a device and a controller to be able to support multiple FAPs simultaneously on the same device/controller port. In this manner a user can have active connections via multiple FAPs simultaneously.

Presently, the DFT-E function enables a device and a controller to support CUT and DFT simultaneously. DFT-E does not, however, allow for the additional support of the 3174-Peer FAP. Likewise, DFT-E does not allow for the additional support of any other FAP which may, in the future, become desirable. Presently, there is no generic process for combining the support of multiple Coax FAPs.

SUMMARY OF THE INVENTION

The present invention comprises a generic process for combining the support of multiple Coax FAPs for simultaneous communication between a controller and an attached device over the same port. The controller and the attached device each support their own collection of Coax FAPs, which may or may not be different. In accordance with the process, information is exchanged between the controller and the device identifying the particular Coax FAPs each respective unit supports and a set of Coax FAPs common to the controller and the device is identified. The controller and the device configure a common communication buffer for supporting the set of common Coax FAPs. Each Coax FAP may be independently enabled or disabled.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 1 is a diagram illustrating one configuration of a communications buffer configured in accordance with the process of the present invention.

FIG. 2 is a diagram illustrating a finite state machine showing the Coax FAP state transition flow in accordance with the process of the present invention.

DETAILED DESCRIPTION OF THE PREFERRED EMBODIMENT

FIG. 1 illustrates a communications buffer 10 of a 3270-type device configured in accordance with the present invention. A communications buffer is a storage area within the device that is addressed by the controller during communication between the two units. The controller is able to write data into the communications buffer as well as read data out of it. Presently, the minimum buffer size for a communications buffer in a 3270-type device is 4 kilobytes (KB) and the maximum is 64 KB.

As shown in FIG. 1, the communications buffer 10 is partitioned into multiple communications areas 12, 14, 16, and 18. One or more communications areas corresponds to a Coax FAP supported by the device. A single Coax FAP may have one communications area or multiple communications areas, depending upon the need of the Coax FAP.

Each communications area 12, 14, 16 and 18 consists of buffer spaces for containing the actual data to be transmitted between the two units. The communications areas can be of any length, limited only by the total communications buffer space available, and can be positioned anywhere within the communications buffer. Each communications area is identified by a Coax FAP ID. Where a single Coax FAP has more than one communications area, those communications areas have the same Coax FAP ID.

The communications buffer 10 is further partitioned so that it has a terminal control area (TCA) 20 for controlling the communications areas 12, 14, 16 and 18. The TCA 20 has buffer spaces for containing the control information required by each supported Coax FAP and is identified by a special Coax FAP ID. As with communications areas, the length of the TCA can be varied according to its needs and can be positioned anywhere within the communications buffer 10.

Terminal Control Area (TCA):

As discussed above, the TCA has buffer spaces for containing the control information for the communications areas. Of the control information, some specific fields are reserved for the Generic Coax FAP process of the present invention. In particular, the following fields are Generic Coax FAP specific:

DTID3 field;
DSTATE field;
CUSTATE field;
the starting addresses of the communications areas; and
the lengths of the communications areas.

DTID3:

The DTID3 field is a one-byte field specifying if the device provides Generic Coax FAP support. If Generic Coax FAPs are supported, the DTID3 field, together with the DSTATE and CUSTATE fields, specifies which Coax FAPs are supported. In particular, Table 1 illustrates how DTID3 is used to indicate the extent of Coax FAP support. Where DTID3=X'00', the device does not support DFT-E or Generic Coax FAPs, but only CUT and/or DFT, depending upon the value of the DSTATE field (to be discussed below). Where DTID3=X'01', the device supports DFT-E only, not Generic Coax FAPs. In the third case where DTID3 >X'01', Generic Coax FAP support is provided and the particular Coax FAPs supported are indicated by the values of the DSTATE and CUSTATE fields as will be discussed below.

TABLE 1

| | |
|---|---|
| B '0 0 0 0  0 0 0 0' | No DFT-E or Generic Coax FAP Support |
| B '0 0 0 0  0 0 0 1' | DFT-E Support Only (No Generic Coax FAP Support) |
| Where DTID3 > X'01' | Generic Coax FAP Support |

DSTATE and CUSTATE:

The Device Coax FAP State (DSTATE) and the Control Unit (or controller) Coax FAP State (CUSTATE) fields represent which Coax FAPs are supported (used initially in conjunction with the DTID3 field) and, subsequently, the state of each Coax FAP during communication with the controller.

Each Coax FAP is represented by one of the bits of the one-byte DSTATE and CUSTATE. For example, as shown in Table 2 below, Bit "1" represents the CUT Interface, Bit "2" represents the DFT Interface, and so on. Bits 4 through 8 are reserved for future, additional Coax FAPs.

TABLE 2

| | 8 | 7 | 6 | 5 | 4 | 3 | 2 | 1 | |
|---|---|---|---|---|---|---|---|---|---|
| B '| . | . | . | . | . | . | . | 1' | CUT Interface State |
| B '| . | . | . | . | . | . | 1 | .' | DFT Interface State |
| B '| . | . | . | . | . | 1 | . | .' | 3174-Peer Interface State |
| B '| . | . | . | . | 1 | . | . | .' | Reserved for additional Coax FAPs |
| B '| . | . | . | 1 | . | . | . | .' | Reserved for additional Coax FAPs |
| B '| . | . | 1 | . | . | . | . | .' | Reserved for additional Coax FAPs |
| B '| . | 1 | . | . | . | . | . | .' | Reserved for additional Coax FAPs |
| B '1 | . | . | . | . | . | . | . | .' | Reserved for additional Coax FAPs |

Initially, when the device and the controller begin communicating, they must decide which Coax FAPs they are to support. The user of the device may wish to support only CUT or DFT, for example, or may wish to support multiple Coax FAPs simultaneously. In order to determine which Coax FAPs the device can support and which Coax FAPs the user wishes to support, the controller reads the DTID3, DSTATE and CUSTATE fields.

As discussed above, where the DTID3 field value is greater than X'01', the device can support and the user wishes to support Generic Coax FAPs. The controller then reads the value of the DSTATE field in order to determine which Coax FAPs the device can support. For example, if Bit 1 of the DSTATE field is high, or equal to "1", the CUT Interface is supported. Likewise, if Bit 2 of the DSTATE field is high, the DFT Interface is supported. Similarly, Bit 3 represents whether 3174-Peer is supported. Bits 4–8 are reserved for future, yet undetermined, Coax FAPs.

The controller then determines which Coax FAPs it supports, and identifies a set of Coax FAPs which are common to the device and the controller. The controller communicates this information to the device so that the device can be configured to use these common Coax FAPs. A detailed description of the process for configuring the system for the set of common Coax FAPs is set forth below.

The DSTATE and the CUSTATE fields are also used for representing the various states of the individual Coax FAPs. Each Coax FAP can be in one of seven states: Undefined; Inactive; Power-On Pending; Disabled; Enable Pending; Enabled; and Disable Pending.

Coax FAP States

Undefined: Initially, when a device powers on and before it begins communication with the controller, the Coax FAPs are in an Undefined state. The device goes through an initialization process to set the DSTATE fields to proper values corresponding to the Coax FAPs supported.

Inactive: After the device initializes, the Coax FAPs are in an Inactive state. They remain inactive until the device is properly configured by the controller for communication.

Power-On Pending: After the device is configured (or redefined) by the controller, the Coax FAPs enter a Power-On Pending state and remain in that state until the controller's power on processing is complete.

Disabled: After the controller has completed its power on processing, the Coax FAPs are disabled and remain in the Disabled state until the device signals to the controller that communication is to take place over one or more of the disabled Coax FAPs. When a Coax FAP is in the Disabled state, the controller only checks the DSTATE field for that particular Coax FAP until it enters the Enable Pending state.

Enable Pending: When the device signals to the controller for initiating communication over one or more Coax FAPs, the Coax FAPs enter and remain in the Enable Pending state until the controller can process any enabling information received from the device, write enabling information (if any), and issue a Start_Op (start operation) to the device (indicating to the device to begin sending frames).

Enabled: While the Coax FAP is in the Enabled state, the attached device and the controller exchange information in the appropriate communication area(s) while continuing to exchange control information in the TCA.

Disable Pending: When the attached device wishes to disable the Coax FAP, it merely resets the Coax FAP bit in the DSTATE field to B'0' (after performing any necessary cleanup and writing any Coax FAP specific error information, if any). After the controller receives the bit 6 status sent by the device, it resets the Coax FAP bit in the CUSTATE field to B'0' (after performing any necessary cleanup and reading the Coax FAP specific error information). The Coax FAP again enters the Disabled state as discussed above.

Coax FAP State Transitions

The transitions between the various Coax FAP states are shown in the finite state machine of FIG. 2. As indicated in the figure, each Coax FAP is initially, at power-on, in the Undefined state. (This is shown in the "STATE" portion of the finite state machine. CUSTATE and DSTATE values are indicated in parenthesis in the far left column.) Although the state transition diagram will be described for a single Coax FAP, multiple Coax FAP transitions may occur simultaneously by modifying multiple bits in the DSTATE/CUSTATE fields.

At power-on, the device initializes by resetting the DSTATE and CUSTATE fields to "0" and setting the appropriate bits in DTID3 to indicate which Coax FAPs are supported by the device. In addition, the device writes additional power-on information relating to the supported Coax FAPs. The additional information includes a Device Generic Coax FAP Power On Descriptor for each Coax FAP supported.

Device Generic Coax FAP Power On Descriptor (DGCPD):

As shown below, the Device Generic Coax FAP Power On Descriptor consists of a two byte length field indicating the length of the DGCPD followed by a Communications Area Length Descriptor.

| Length | Communications Area Length Descriptor |

Communications Area Length Descriptor:

The Communications Area Length (CAL) Descriptor specifies a communications area length for each Coax FAP supported by the device. As shown below, its format consists of a one-byte length field ("Length") indicating the length of the CAL Descriptor, a CAL Descriptor identifier ("CALD_Ind") indicating that it is a Communications Area Length Descriptor, and Coax FAP information including a Coax FAP ID for each Coax FAP (1−n) supported ("Coax_FAP_IDn") and a corresponding Communications Area Length field for each Coax FAP supported ("CAL(Coax_FAP_IDn)").

| Length | CALD_Ind | Coax_FAP_IDn | CAL(Coax_FAP_IDn) | ...

Responding to a controller poll, the device issues a POR (Power-On Reset) to the controller, indicating to the controller that the device is powered-on and ready for communication.

Upon receiving the POR command, the controller determines that the attached device supports Generic Coax FAPs and which Coax FAPs the attached device wishes to support by reading the DTID3 and DSTATE fields. The controller provides a power on descriptor (Controller Generic Coax FAP Power On Descriptor) for properly partitioning the communications buffer for the supported Coax FAPs.

Controller Generic Coax FAP Power On Descriptor:

As shown below, the Controller Generic Coax FAP Power On Descriptor (CGCPD) consists of a two-byte length field ("Length_CGCPD") indicating the total length of the descriptor and a Communications Buffer Partitioning Descriptor (CBPD) describing how the communications buffer in the attached device should be partitioned upon power on. The CBPD includes the following fields:

- a length field ("Length_CBPD") indicating the length of the CBPD; and
- two or more Coax FAP Communications Area (CA) Descriptors, each Coax FAP CA Descriptor consisting of:
  - a Coax FAP ID field ("FAP_IDm") identifying each supported Coax FAP (1−m);
  - a CA Start Address field ("CA_addr(FAPm)") indicating where the communications area for that Coax FAP starts; and a CA Length field ("CA_length(FAPm)") specifying the length of the Coax FAP communications area.

```
********* Controller Generic Coax FAP Power On Descriptor *************
     ***** Communications Buffer Partitioning Descriptor ******
              **** CA Descriptor(s) for Coax FAPs 1-m *****
----------------------------------------------------------------------
| Length_CGCPD | Length_CBPD | FAP_IDm | CA_addr(FAPm) | CA_length(FAPm) |
----------------------------------------------------------------------
```

The Controller Generic Coax FAP Power On Descriptor provides information to the attached device so that it can properly partition its communications buffer so that both units support the commonly support "m" Coax FAPs.

The controller then sets the appropriate bits in the CUSTATE field corresponding to the Coax FAPs which are supported by the device and the controller. At this point, those Coax FAPs are now in the Power-On Pending state. As discussed above, the Power-On Pending state is merely a state which each supported Coax FAP remains until the device is reconfigured (or redefined) with the set of common Coax FAPs. The controller issues an RDEF (redefine) command and a Start_Op (start operation) command to the device. This operation effectively tells the device which Coax FAPs are common between the controller and the device and are to be supported by both.

The device, upon receiving these commands, formats the communications buffer into communications areas corresponding to the set of common Coax FAPs and responds to the controller with a "Bit 6 Status". A Bit 6 Status is essentially a reply to a controller command indicating that the device has completed whatever was commanded, in this case, a redefinition.

The controller and the attached device have now determined which Coax FAPs will be mutually supported. Upon receiving the Bit 6 Status, the controller completes the controller power on processing for the commonly supported Coax FAPs. For example, for a given Coax FAP, the controller performs any additional initialization, resets the Coax FAP bit in the CUSTATE field, and issues a Start_Op command. This signals the power on completion for that particular Coax FAP. The controller may signal power on completion for multiple Coax FAPs by setting the appropriate Coax FAP bits in the CUSTATE field before issuing the Start_Op command. With the Coax FAP bits in both the DSTATE and the CUSTATE fields reset to zero, the corresponding Coax FAPs are in the Disabled state.

Each Coax FAP may independently transition between the Disabled and Enabled state so that communication may take place over a particular Coax FAP. To initiate communication over a Coax FAP, the device signals to the controller for the Coax FAP enter the Enable Pending state. The device signals to the controller by writing any Coax FAP specific information, by setting the appropriate Coax FAP bit in the DSTATE field, and by returning a bit 6 status to the controller. The controller responds by processing the enabling information received from the device, writing Coax FAP specific enabling information (if any), setting the Coax FAP bit in the CUSTATE field, and issue a Start_Op to the device (indicating to the device to begin sending frames). The selected Coax FAP(s) is/are changed into the Enabled state for communication thereover.

While a Coax FAP is in the Enabled state, the attached device and the controller exchange information in the appropriate communication area(s) while continuing to exchange control information in the TCA.

Either the device or the controller can disable a Coax FAP. Where the device wishes to disable the Coax FAP, the device simply resets the appropriate Coax FAP bit in the DSTATE field (after performing any necessary cleanup and writing any Coax FAP specific error information, if any) and returns a bit 6 status to the controller thereby putting the Coax FAP in a Disable Pending state. After the controller receives the bit 6 status status sent by the device, it resets the Coax FAP bit in the CUSTATE field to B'0' (after performing any necessary cleanup and reading the Coax FAP specific error information). The Coax FAP again enters the Disabled state as discussed above.

Where the controller wishes to disable the Coax FAP, it must force an error on the Coax FAP. When a Coax FAP has an error, the attached device puts it into the Disable Pending state, as discussed above, resets the Coax FAP bit in the DSTATE field and returns a bit 6 status status to the controller.

While the invention has been particularly shown and described with reference to preferred embodiments thereof, it will be understood by those skilled in the art that various other changes in form and detail may be made without departing from the spirit and scope of the invention.

What is claimed is:

1. In a system comprising a controller, having a communications buffer, connected to a 3270-type device by a transmission medium (Coax) for communicating using the 3270 data stream, said controller supporting a plurality of formats and protocols (FAPs) for operating over said Coax, and a device supporting a plurality of Coax FAPs wherein said controller and said device communicate over said Coax using one of said Coax FAPs, a method of configuring said system for supporting Coax FAPs common to said device and said controller comprising the steps of:

identifying a first set of Coax FAPs which said device supports;

identifying a second set of Coax FAPs which said controller supports;

identifying a third set of Coax FAPs which contain at least two common FAPs supported by both said device and said controller; and configuring said system so that at least two of said common Coax FAPs of said third set of Coax FAPs are enabled for simultaneous communication between said device and said controller over said Coax, said system configuring step comprising the steps of partitioning said communication buffer into a plurality of communications areas with each one of said communications areas corresponding to different ones of said third set of Coax FAPs and further partitioning said communications buffer so that it has a terminal control area (TCA) consisting of a plurality of buffer spaces containing control information relating to different ones of said communications areas, wherein said system simultaneously uses said communications areas and said buffer spaces associated with said at least two enabled common Coax FAPs to communicate information with said device.

2. The method as defined in claims 1, wherein system configuring step further comprises the step of configuring said system for supporting one or more of a control unit terminal (CUT) Coax FAP, a distributed function terminal (DFT) Coax FAP, and a 3174-Peer Coax FAP.

3. In a system comprising a controller connected to a 3270-type device, having a communications buffer, by a transmission medium (Coax), said controller supporting a first set of formats and protocols (FAPs) for communicating using the 3270 data stream protocol over said Coax, and said device supporting a second set of Coax FAPs for communicating using the 3270 data stream protocol over said Coax, wherein said controller and said device communicate over said Coax using one or more of said Coax FAPs, a method, in said controller, of configuring said device comprising the steps of:

receiving information, in said controller, from said device identifying said second set of Coax FAPs;

from said first and second sets of Coax FAPs, identifying a third set of Coax FAPs comprising at least two Coax FAPs common to said first and second sets of Coax FAPs; and configuring said device so that at least two of said common Coax FAPs of said third set of Coax FAPs is enabled for simultaneous communication between said device and said controller over said Coax, said device configuring step comprising the steps of partitioning said communication buffer into a plurality of communications areas with each one of said communications areas corresponding to different ones of said third set of Coax FAPs and further partitioning said communications buffer so that it has a terminal control area (TCA) consisting of a plurality of buffer spaces with each one of said buffer spaces containing control information relating to different ones of said communications areas wherein said controller simultaneously uses said communications areas and said buffer spaces associated with said at least two enabled common Coax FAPs to communicate information with said controller.

4. The method as defined in claim 3, wherein said device configuring step further comprises the step of configuring said device for supporting one or more of a control unit terminal (CUT) Coax FAP, a distributed function terminal (DFT) Coax FAP, and a 3174-Peer Coax FAP.

5. In a system comprising a controller connected to a 3270-type device, having a communications buffer, by a transmission medium (Coax), said controller supporting a first set of formats and protocols (FAPs) for communicating using the 3270 data stream protocol over said Coax, and said device supporting a second set of Coax FAPs for communicating using the 3270 data stream protocol over said Coax, wherein said controller and said device communicate over said Coax using one or more of said Coax FAPs, a method of configuring said device comprising the steps of:

sending information, from said device, to said controller identifying said second set of Coax FAPs;

receiving information, in said device, from said controller identifying a third set of Coax FAPs comprising Coax FAPs common to said first and second sets of Coax FAPs; and configuring said device so that at least two of said common Coax FAPs of said third set of Coax FAPs is enabled for simultaneous communication between said device and said controller over said Coax, said device configuring step comprising the steps of partitioning said communication buffer into a plurality of communications areas with each one of said communications areas corresponding to different ones of said third set of Coax FAPs and further partitioning said communications buffer so that it has a terminal control area (TCA) consisting of a plurality of buffer spaces with each one of said buffer spaces containing control information relating to different ones of said communications areas wherein said device simultaneously uses said communications areas and said buffer spaces associated with said at least two enabled common Coax FAPs to communicate information with said controller.

6. The method as defined in claim 5, wherein said device configuring step further comprises partitioning said TCA so that said TCA has buffer spaces for containing a Coax FAP support identifier for identifying which Coax FAPs said device supports and buffer spaces for containing a Coax FAP state identifier for identifying the particular state in which said Coax FAPs are.

7. The method as defined in claim 5, wherein said device configuring step further comprises the step of configuring said device for supporting one or more of a control unit terminal (CUT) Coax FAP, a distributed function terminal (DFT) Coax FAP, and a 3174-Peer Coax FAP.

8. A controller for being connected by a transmission medium (Coax) to a 3270-type device supporting a first set of formats and protocols (FAPs) for communicating using the 3270 data stream protocol with said device over said Coax using one or more of said Coax FAPs, said controller comprising:

means for supporting a second set of Coax FAPs for communicating over said Coax;

means for receiving information from said device identifying said first set of Coax FAPs;

means for identifying, from said first and second sets of Coax FAPs, a third set comprising at least two Coax FAPs common to said first and second sets of Coax FAPs; and means for configuring said device so that at least two of common said Coax FAPs of said third set of Coax FAPs is enabled for simultaneous communication between said device and said controller over said Coax said device configuring means comprising means for partitioning said communication buffer into a plurality of communications areas with each one of said communications areas corresponding to different ones of said third set of Coax FAPs and means for partitioning said communications buffer so that it has a terminal control area (TCA) consisting a plurality of buffer spaces with each one of said buffer spaces containing control information relating to different ones of said communications areas wherein said controller simultaneously uses said communications areas and said buffer spaces associated with said at least two enabled common Coax FAPs to communicate information with said device.

* * * * *